(12) United States Patent
Crintea

(10) Patent No.: US 11,842,338 B2
(45) Date of Patent: Dec. 12, 2023

(54) PAYMENT ENCRYPTION SYSTEM

(71) Applicant: Fastforward Labs Ltd., London (GB)

(72) Inventor: Dragos-Liviu Crintea, London (GB)

( * ) Notice: Subject to any disclaimer, the term of this patent is extended or adjusted under 35 U.S.C. 154(b) by 172 days.

(21) Appl. No.: 17/617,926

(22) PCT Filed: Jun. 9, 2020

(86) PCT No.: PCT/EP2020/065952
§ 371 (c)(1),
(2) Date: Dec. 9, 2021

(87) PCT Pub. No.: WO2020/249554
PCT Pub. Date: Dec. 17, 2020

(65) Prior Publication Data
US 2022/0309494 A1    Sep. 29, 2022

Related U.S. Application Data

(60) Provisional application No. 62/859,197, filed on Jun. 10, 2019.

(51) Int. Cl.
*G06Q 20/38* (2012.01)
*G06Q 20/40* (2012.01)
*G06Q 20/02* (2012.01)

(52) U.S. Cl.
CPC ..... *G06Q 20/3823* (2013.01); *G06Q 20/3827* (2013.01); *G06Q 20/3829* (2013.01)

(58) Field of Classification Search
CPC ........... G06Q 20/3823; G06Q 20/3827; G06Q 20/3829; G06Q 20/40; G06Q 20/02
(Continued)

(56) References Cited

U.S. PATENT DOCUMENTS 6,029,150 A  *  2/2000  Kravitz ................. G06Q 20/12
                                                         705/77
2018/0191503 A1*  7/2018  Alwar ....................... H04L 9/14
(Continued)

FOREIGN PATENT DOCUMENTS

CN        110199308 A  *  9/2019  ......... G06F 16/1837

OTHER PUBLICATIONS

Kinmond et al. "CardEaseXML", CreditCall Communications Ltd, Sep. 2011, 89 pages (Year: 2011).*
(Continued)

*Primary Examiner* — James D Nigh

(57) ABSTRACT

A payment method and apparatus wherein a customer sends a transaction message from a customer account for a current transaction to a payment processor and to a supplier including a hash of transaction information from a previous transaction of the customer with the payment processor, a hash of transaction information from the current transaction and an encryption of transaction information for the current transaction including a state of the transaction. The transaction information from the current transaction along with the hash of the transaction information from the previous transaction is stored in a stream of transaction data in the customer account by the customer. The payment processor compares the hash of the transaction information from the previous transaction with a stored hash of the transaction information from the previous transaction to authenticate the customer.

21 Claims, 7 Drawing Sheets

(58) Field of Classification Search
USPC .......................................................... 705/71
See application file for complete search history.

(56) References Cited

U.S. PATENT DOCUMENTS

2020/0005286 A1* 1/2020 Sewell ............... G06Q 20/0658
2020/0186355 A1* 6/2020 Davies .................. H04L 63/029

OTHER PUBLICATIONS

Javidan et al. "A New Security Algorithm for Electronic Payment via Mobile Phones", 2010 3rd International Symposium on Applied Sciences in Biomedical and Communication Technologies, Jan. 22, 2011, 5 pages (Year: 2010).*

* cited by examiner

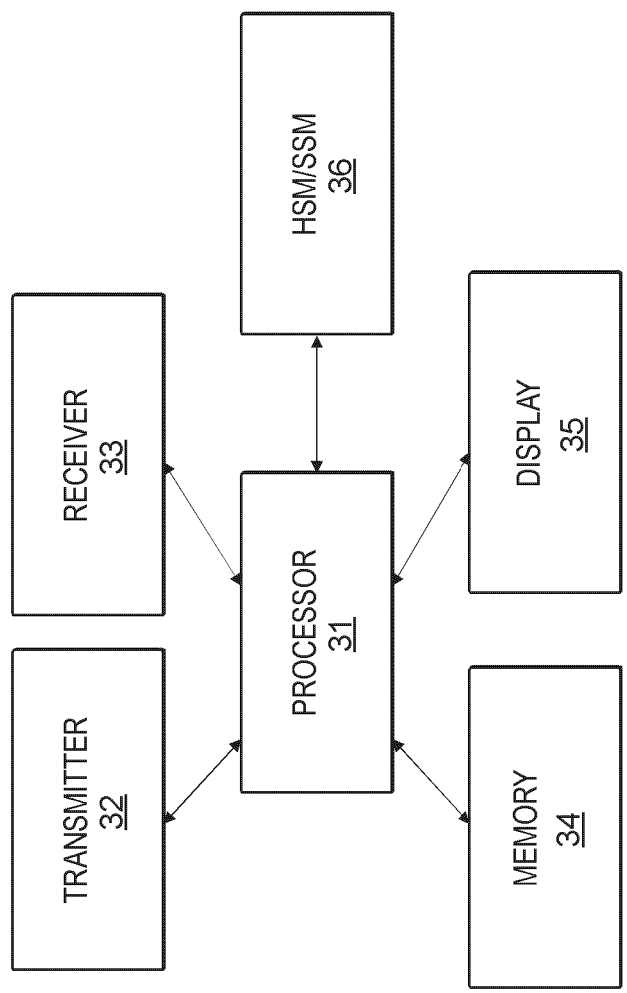

PAYMENT ENCRYPTION SYSTEM

PRIORITY CLAIM AND CROSS-REFERENCE TO RELATED APPLICATIONS

This application is a U.S. national stage application filed under 35 U.S.C. § 371 of, and claims priority to and the benefit of, International Patent Application No. PCT/EP2020/065952, filed on Jun. 9, 2020, which is incorporated by reference herein in its entirety, and which claims priority to and the benefit of U.S. Provisional Application No. 62/859,197, filed Jun. 10, 2019, which is incorporated by reference herein in its entirety.

BACKGROUND OF THE INVENTION

The present invention relates to an improved data structure for use in payment systems.

Current payment systems, particularly those that utilize a credit card processor for completing a payment transaction, are plagued by delays and fraud.

Currently payments from a card provider to a merchant are not made in real time. There is a delay of 24 h to 3 days between the time of the transaction and the time the merchant will be paid.

A great deal of effort has been made to minimize account fraud (e.g., Checking/Debit account and Credit Card fraud). In the case of credit cards, current capabilities in advanced economies allowed a debit or credit card to be re-issued in a matter of days. In the case of checking account fraud, it can take weeks to months to recover money withdrawn fraudulently. Recent data breaches have exposed the vulnerabilities across many domains from insurance, credit rating to non-financial systems storing customer data and account information.

Many payment systems for online and app-based purchases utilize $3^{rd}$-party payment processors that become direct targets for fraud perpetrated via card spoofing.

SUMMARY OF THE INVENTION

One object of an embodiment the present invention is to provide an improved payment system that is resistant to fraud and processes transactions faster.

A method for effecting a payment to a supplier from a payment processor on behalf of a customer is disclosed, wherein the customer sends a transaction message from a customer account for a current transaction to a payment processor and to a supplier. The transmission of the messages can be done through a single or multiple communication channels. The transaction information is sent part in an encrypted form and part in plain text. The encrypted part of the transaction contains a random transaction hash taken from the history information of previous transactions and a token in form of a shared secret. The plain text part of the message contains the customer generated id of the transaction, the hash of the encrypted information, the timestamp on which it was initiated, the transaction hash and the state of the transaction which is set to NEW. The supplier (payment) device will receive this data, and will add the amount, the supplier id in form of an authentication token, the hash of the encrypted information, the timestamp on which the supplier has added the data to the transaction and the state set to PENDING. The encryption is a public key/private key encryption with one key provided to the payment processor by the customer and a different key provided by the payment processor to the customer and wherein the two keys each verifies the authenticity of different portions of the encrypted transaction information for the current transaction. The payment device contains an in-ROM burn key or a security chip able to authenticate the device to the payment processor network. The transaction information from the current transaction along with the hash of the transaction information and the hash of the previous transaction is stored in a stream of transactions data in the customer account by the customer.

In accordance with a preferred embodiment of the present invention, the customer account includes a hierarchical deterministic wallet for private/public keys for use with a plurality of suppliers and payment processors. Preferably, for privacy aware data sharing and secure multi-party computation, the encryption is a homomorphic encryption and more preferably the encryption is a polymorphic encryption. Additionally, in a preferred embodiment, the transaction information includes a transaction amount, supplier information, shared secret token and transaction identification information and wherein the payment processor can decrypt the encrypted part of the information. In another embodiment, the transaction information includes a transaction amount, supplier information, customer information and transaction identification information and wherein the supplier can decrypt client identification information on a limited basis. Preferably, the supplier can decrypt a client delivery address only a single time.

In accordance with yet another embodiment of the present invention, an electronic receipt is received from the supplier and the electronic receipt is stored in a separate stream of transaction data. In an alternative embodiment, the account includes supplier loyalty card information or customer medical data for sharing with a medical services supplier.

In accordance with another embodiment of the invention, a method is provided for effecting payment to a supplier by a payment processor on behalf of a customer, wherein the payment processor receives a transaction message from a customer for a current transaction including a random transaction hash information from a previous transaction of the customer with the payment processor, a hash of transaction information from the current transaction and an encryption of transaction information for the current transaction including a state of the transaction, wherein the encryption is a public key/private key encryption with the public key provided to the payment processor by the customer and wherein the message signature of the customer verifies the authenticity of the provided information. Additionally, the customer and the payment provider share a secret token for every transaction. With the provided customer public key the payment provider decrypts the message. The payment processor compares the random transaction hash information with stored hashes from the previous transactions as well as the shared secret to authenticate the customer. If the customer is authenticated, the payment processor stores the transaction information from the current transaction along with the hash of transaction information from the current transaction and the state of the transaction in a stream of transaction data and upon approving payment in the current transaction, the payment processor updates the state of the current transaction in the stream of transaction data and sends a transaction receipt message to the supplier for the current transaction with updated state information.

In accordance with a preferred embodiment of the present invention, the encryption is a homomorphic encryption, and more preferably the encryption is a polymorphic encryption for privacy aware data sharing and secure multi-party computation. Preferably, the transaction information includes a transaction amount, supplier information, customer information and transaction identification information and wherein the payment processor can decrypt the customer and supplier information.

In accordance with a further embodiment of the invention, a method is provided for effecting payment to a supplier from a payment processor on behalf of a customer, wherein the supplier receives a transaction message from a customer for a current transaction including an encryption of transaction information for the current transaction including a state of the transaction, wherein the encryption is a public key/private key encryption with the public key provided to the payment processor by the customer and wherein the public key of the payment processor verifies the authenticity of the provided information and wherein the encryption provides only limited access to customer identification information in the transaction information. The supplier stores transaction information from the current transaction and upon receiving an update to the state of the current transaction from the payment processor, the supplier accesses customer identification information on a limited basis to complete the current transaction.

In accordance with another preferred embodiment of the present invention, the encryption is a homomorphic encryption, and more preferably, the encryption is a polymorphic encryption. Preferably, the transaction information includes a transaction amount, supplier information, customer information, and transaction identification information and wherein the supplier can decrypt client identification information on a limited basis, preferably only a single time. In a preferred embodiment, the supplier sends an electronic receipt to the customer for storing in the customer stream of added transaction data. In an alternative embodiment, the transaction information includes supplier loyalty card information or customer medical data.

In accordance with another embodiment of the present invention, a payment processor apparatus for effecting a payment to a supplier from a payment processor on behalf of a customer includes a transmitter for sending a transaction message from a customer account for a current transaction to a payment processor and to a supplier including a hash of transaction information from a previous transaction of the customer with the payment processor, a hash of transaction information from the current transaction and an encryption of transaction information for the current transaction including a state of the transaction, wherein the encryption is a public key/private key encryption with one public key provided to the supplier by the customer and a different public key provided to the payment processor by the customer and wherein each of the two public keys verifies the authenticity of a different portion of the encrypted transaction information for the current transaction, and a memory for storing transaction information from the current transaction along with the hash of the transaction information from the previous transaction in a stream of transaction data in the customer account. Preferably, the customer account includes a hierarchical deterministic wallet for generating public keys for use with a plurality of suppliers and payment processors. Additionally, the encryption is preferably a homomorphic encryption and, more preferably, a polymorphic encryption.

In addition, the transaction information preferably includes a transaction amount, supplier information, customer information, and transaction identification information and wherein the transaction amount and supplier information is decryptable by the payment processor. Alternatively, the transaction information includes a transaction amount, supplier information, customer information, and transaction identification information and wherein the client identification information is decryptable by the supplier on a limited basis, preferably the supplier can decrypt a client delivery address only a single time. Preferably, the payment processor apparatus further comprises a receiver for receiving an electronic receipt from the supplier and wherein the electronic receipt is stored in the stream of transaction data in the memory. In another preferred embodiment, the account includes supplier loyalty card information or customer medical data for sharing with a medical services supplier.

In accordance with yet another embodiment of the present invention, a customer apparatus for effecting payment to a supplier by a payment processor on behalf of a customer, comprises a receiver for receiving a transaction message from a customer for a current transaction including a hash of transaction information from a previous transaction of the customer with the payment processor, a hash of transaction information from the current transaction and an encryption of transaction information for the current transaction including a state of the transaction, wherein the encryption is a public key/private key encryption with the public key provided to the payment processor by the customer and wherein the public key of the payment processor verifies the authenticity of the provided information, a comparator for comparing the hash of the transaction information from the previous transaction with a stored hash of the transaction information from the previous transaction to authenticate the customer, a memory for storing transaction information from the current transaction along with the hash of transaction information from the current transaction and the state of the transaction in a stream of transaction data if the customer is authenticated, a processor for updating the state of the current transaction in the stream of transaction data upon approving payment in the current transaction, and a transmitter for sending a transaction message to the supplier for the current transaction with updated state information.

In accordance with a preferred embodiment of the present invention, the encryption is a homomorphic encryption and, more preferably, the encryption is a polymorphic encryption. Preferably, the transaction information includes a transaction amount, supplier information, customer information, and transaction identification information and wherein the transaction amount and supplier information is decryptable by the payment processor.

In accordance with another embodiment of the present invention, a supplier apparatus is provided for effecting payment to a supplier from a payment processor on behalf of a customer, comprising a receiver for receiving a transaction message from a customer for a current transaction including an encryption of transaction information for the current transaction including the state of the transaction. The encryption provides only limited access to customer identification information in the transaction information, a memory for storing transaction information from the current transaction, and a processor for accessing customer identification information on a limited basis to complete the current transaction upon receiving an update to the state of the transaction of the current transaction from the payment processor.

In accordance with a further preferred embodiment of the present invention, the supplier apparatus further comprises a transmitter for sending an electronic receipt to the customer for storing in the customer stream of transaction data. In addition, in an alternative embodiment, the transaction information includes supplier loyalty card information or customer medical data.

These and other features of embodiments of the present invention will be described in more detail with respect to the following drawings wherein:

BRIEF DESCRIPTION OF THE DRAWINGS

FIG. 5 is a block diagram of a supplier apparatus in accordance with an embodiment of the present invention;

DETAILED DESCRIPTION OF THE INVENTION

Figure 1:
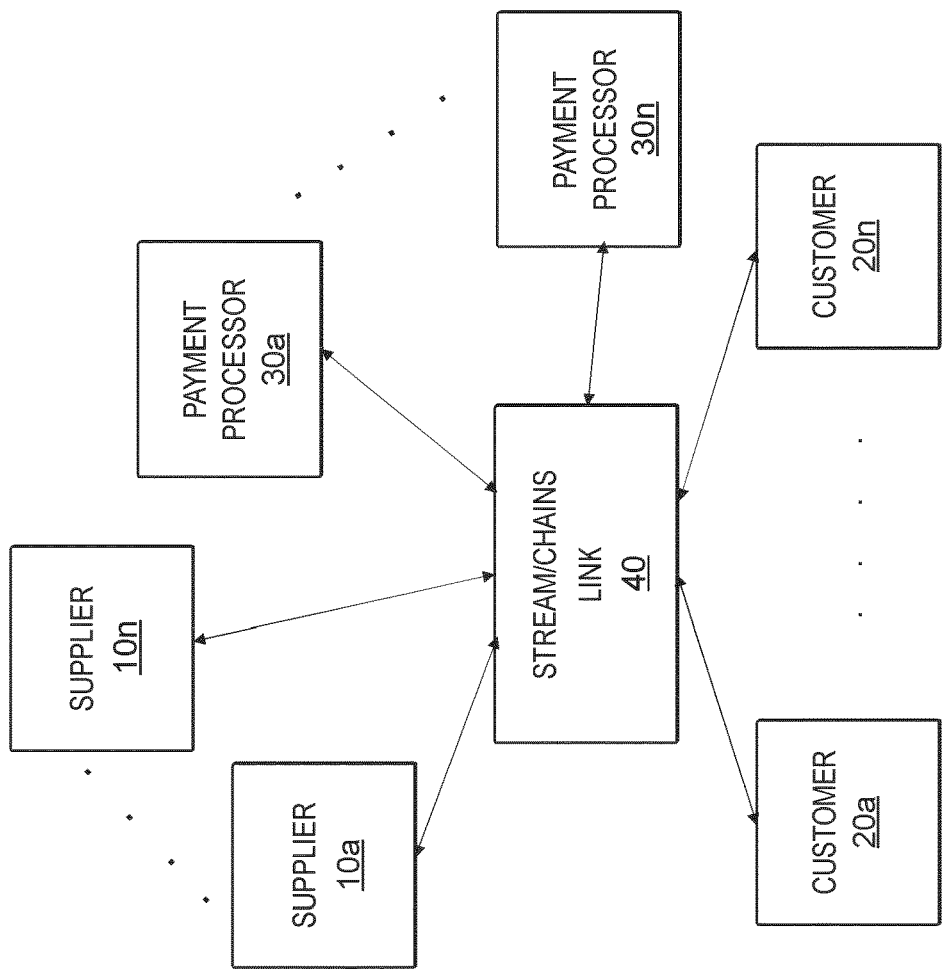
FIG. 1 is a block diagram of a network system in accordance with an embodiment of the present invention.

Referring now to FIG. 1, a network for the method and apparatus in accordance with an embodiment of the present invention is shown. As is understood by those of skill in the art, payment methods generally include three parties: the customer, the supplier of the product or service that is to be purchased by the customer, and a payment processor. A payment processor is typically a credit card company, a debit card company, a credit company such as PayPal, and other third-party payment processors. In the network 1, a plurality of customers 20a-20n, a plurality of suppliers 10a-10n and a plurality of payment processors 30a-30n are depicted. Preferably, the network would operate with one or more of each. The at least three parties are connected to a stream/chains link 40 which comprises one or more computer servers that transmit messages between the three parties to a transaction. The communications can be wireless via satellite, microwave, cellular protocols such as CDMA and LTE, Wi-Fi, Bluetooth, 802.15 or any other short range or long-range wireless protocol. Connections can also include wired protocols such as ethernet and can be part of intranets, extranets, and the Internet.

Figure 8:
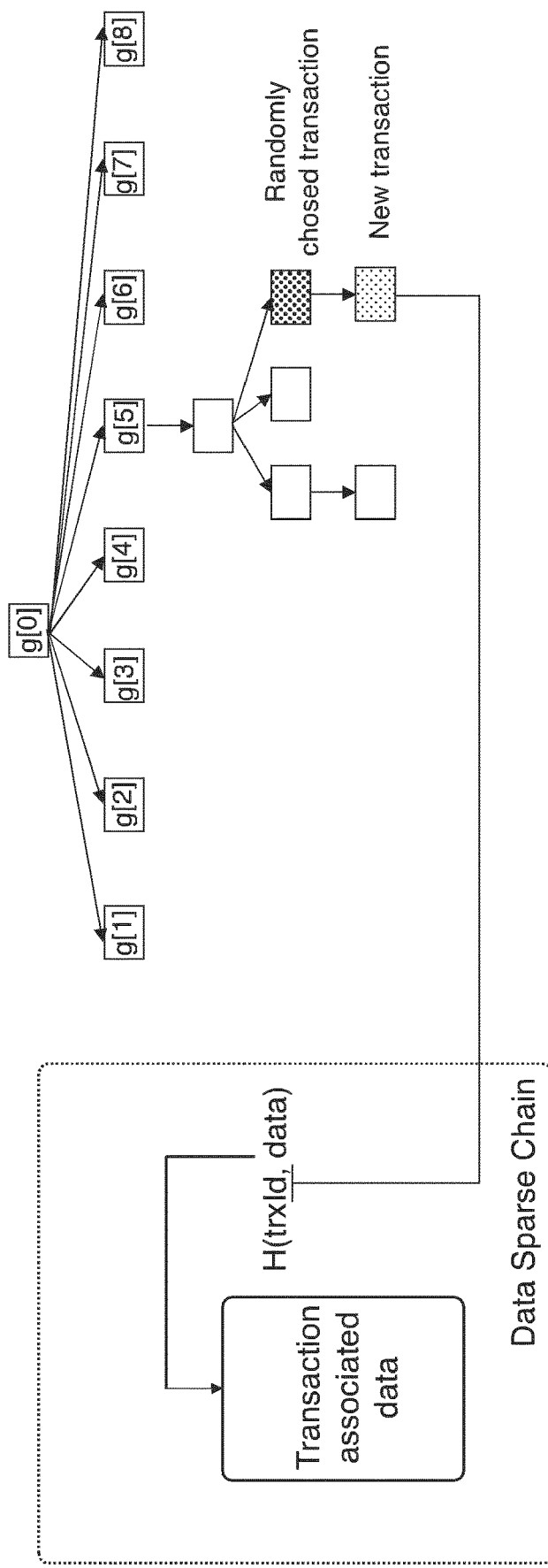
FIG. 8 is a diagram of the linkage of a chain transaction with associated data in accordance with an embodiment of the present invention.

The stream/chains link 40 preferably includes a network level protocol linking the parties involved in transactions. It can operate on current existing network infrastructure. It allows multiple customer/supplier/payment processor chains to operate and securely exchange information. It also maintains a copy of transactions in encrypted form, such that secure multi-party computation can be performed. Preferably, the stream/chains link 40 securely stores receipts, customer loyalty points, medical data, transaction data, and/or the like in a data sparse chain, shown in FIG. 8, such that the right to be forgotten can be applied without compromising chain integrity. The storage mechanism of link 40 creates a hash-pointer to the transaction hash. If any of the parties are entitled to and wish to delete an added element to the transaction (e.g., a receipt or other data associated with the transaction), the deletion of the added element can be made and the transaction will still be valid in the chain of transactions.

For an in-app purchase the app can interface directly with the stored payment methods available on the smartphone or other customer apparatus. This benefits the customer by having a single point of payments whereby every mobile transaction can be seen and recorded on the chain of choice when selecting the payment method. Micropayments are also be enabled through QR codes.

Figure 2:
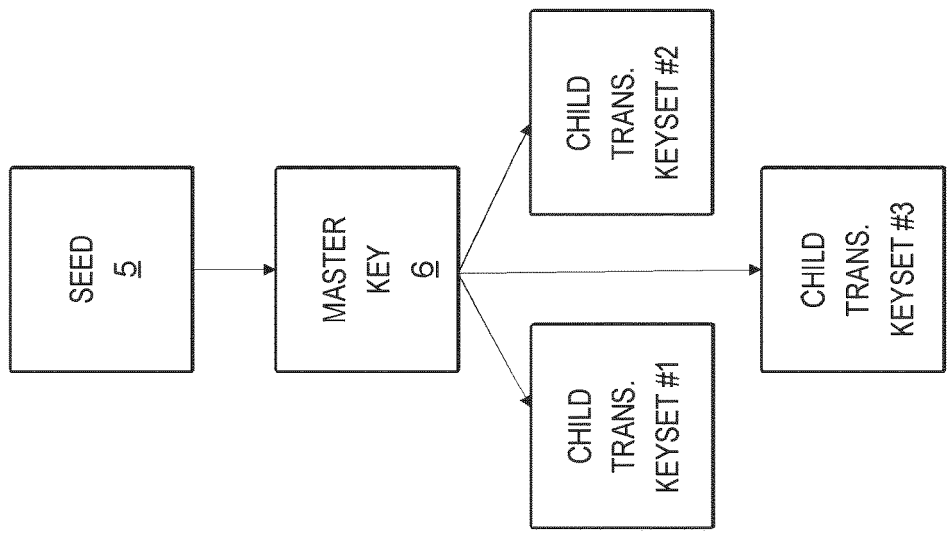
FIG. 2 is a flow chart showing a method of keyset generation of a hierarchical wallet in accordance with an embodiment of the present invention.

A key aspect of preferred embodiments of the present invention is the generation of public and private keysets for the encryption used in the invention. FIG. 2 shows a method of keyset generation for a deterministic hierarchical wallet that can be implemented using processors and software. The keysets start with a seed 5 which is typically a grouping of 5 letter words. The seed creates a master key 6 which is then used to generate multiple child keysets of public and private keys for the transactions.

Embodiments of the present invention combine assymetric key generation with the use of polymorphic and homomorphic encryption onto a chain of transactions. Together the two methods allow a substantial increase in confirmed transaction speeds, a novel application of secure multi-party computation, transaction security, and segregated access to data across multiple parties. In certain embodiments, the present invention can be implemented without the use of a smart contracts or blocks of a blockchain or distributed ledger.

Figure 3:
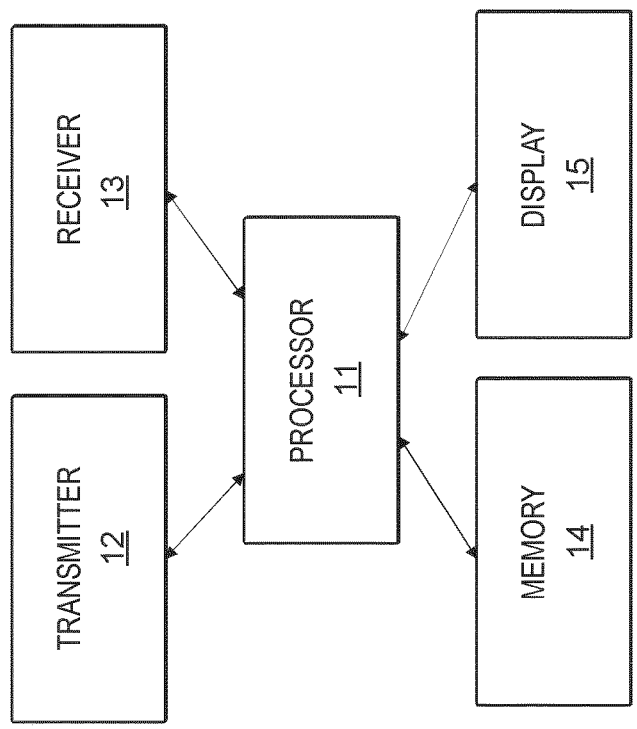
FIG. 3 is a block diagram of a customer apparatus in accordance with an embodiment of the present invention.

FIG. 3 shows the basic structure of the customer apparatus for carrying out a method in accordance with an embodiment of the present invention. A processor 11 is programmed to control a transmitter 12 and receiver 13 for communicating messages to parties involved in the transaction. A memory 14 holds the program instructions for the processor and a database of transaction data that will be described in more detail hereinafter. The display 15 provides a user interface for the customer. The processor 11 also handles the encryption and decryption as well as hashing, but one of skill in the art understands that these tasks can also be handled by additional processors or more preferably, a secure feature of the apparatus such as a hardware or software security module. The customer apparatus may be, in some embodiments, embodied in a smartphone such as an iPhone or Android phone, a tablet such as an iPad or Android based tablet, a desktop computer, a laptop computer, a Chromebook, or the like.

Figure 6:
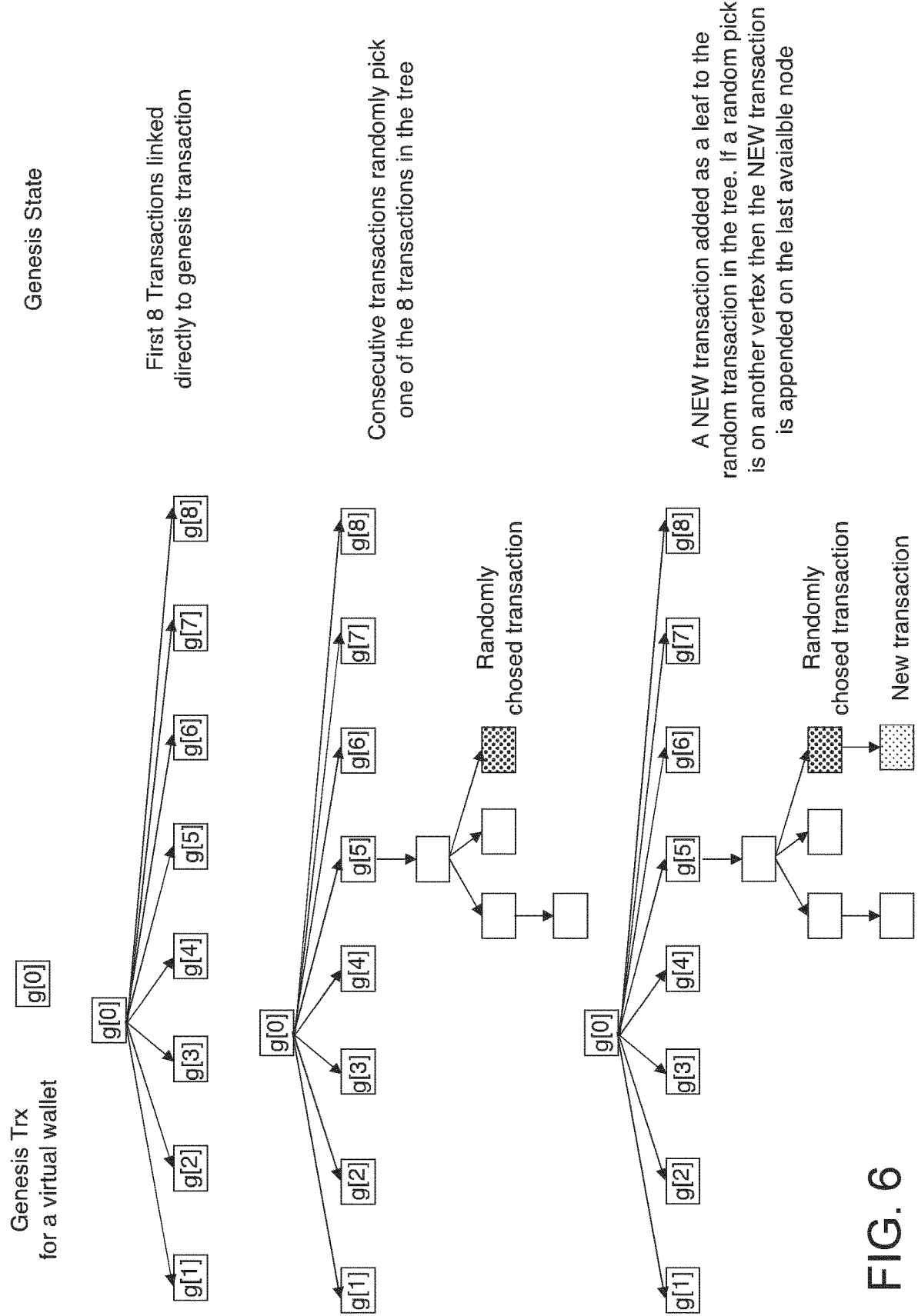
FIG. 6 is a diagram of the genesis and transaction stream for a wallet keyset in accordance with an embodiment of the present invention.

The customer application may be installed or interfaced with on a device fulfilling the requirements above. Upon successful registration of a payment method, a new stream/chain is created and initiated with a blank confirmation transaction of 1 cent in the currency of the card. Asymmetric cryptographic keys are generated both by the user and the card provider to authenticate the validity of signed messages from both parties. These keys are then linked to a newly generated wallet (described herein). An example of the wallet generation process is shown in FIG. 6.

A UTXO representing the card limit value is set on the device, thus maintaining in real-time the amount of credit available. At specific period of times a check will be performed for reverse transactions credited to the card. An RSA token installed on the device is used as a shared secret.

Figure 7A:
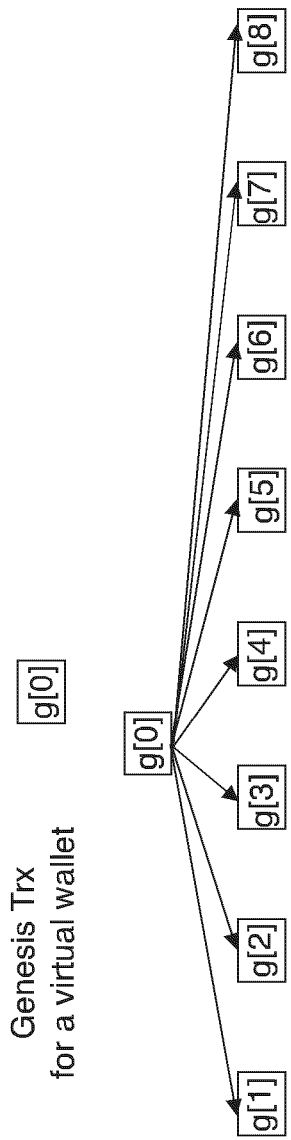
FIGS. 7A and 7B are diagrams of successful and failed transaction chains in accordance with an embodiment of the present invention.
Figure 7B:
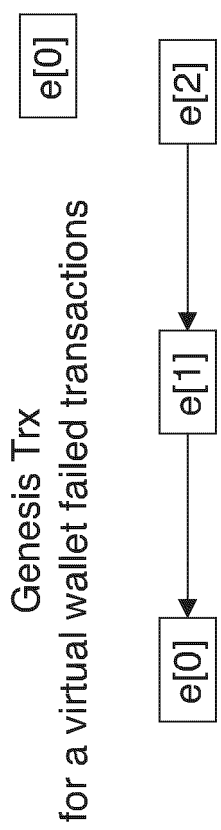

This will be known only to the payment provider and the customer. The validity of the token is set to an arbitrary amount of time to take into consideration the time-drift between the parties involved in the transaction. When this time expires, and the transaction state is not yet complete the transaction is rolled back. No chain entry in the payment chain is appended. Failed transactions are added to a fail chain on both the payment provider and customer stream/chains. An example of a fail chain is shown in FIG. 7B as a linked list.

An in-app purchase will further leverage biometric or additional security mechanisms added by the mobile device. By interfacing with the stream/chain application the customer will be presented at the moment of payment with multiple choices available as stored payment. This allows a seamless integration when paying with loyalty points, generated coupons as well as in the chosen currency.

Figure 4:
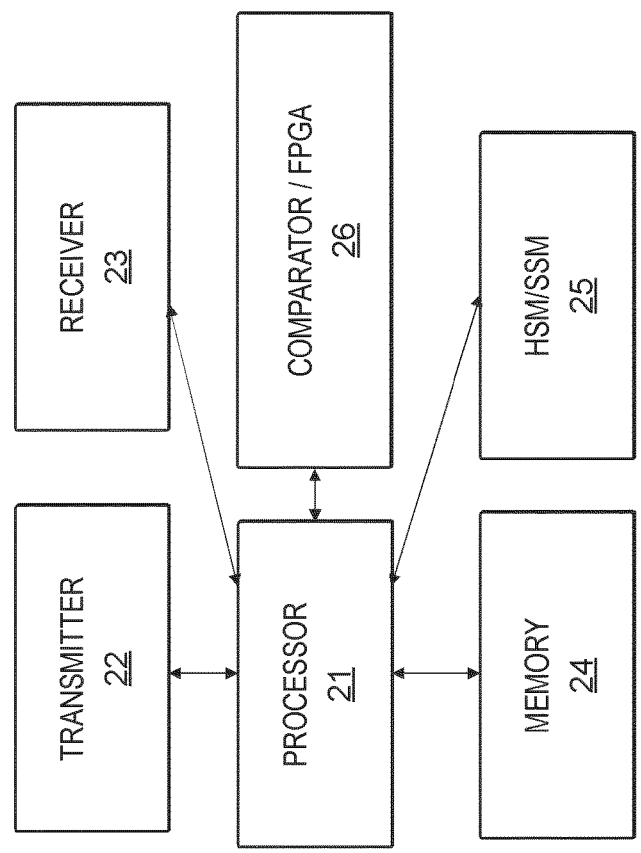
FIG. 4 is a block diagram of a payment processor apparatus in accordance with an embodiment of the present invention.

FIG. 4 shows the basic structure of a payment processor apparatus for carrying out a method in accordance with an embodiment of the present invention. A processor 21 is programmed to control a transmitter 22 and receiver 23 for communicating messages to the other parties. The processor is enabled to execute the stream/chain program in a trusted execution environment (TEE). As an example, for a non-exhaustive list of chip makers, for an INTEL chip the trusted execution environment is SGX, ARM: TrustZone or for AMD Secure Execution Environment. A memory 24 holds the program instructions for the processor and a database of transaction data that will be described in more detail hereinafter. The apparatus also includes a comparator 26 which can be implemented in software in the processor or in hardware using a digital comparator circuit, preferably an FPGA module. The processor 21 also handles the encryption and decryption as well as hashing, but one of skill in the art understands that these tasks can also be handled by additional processors or more preferably, an application specific hardware security module (HSM) or software security module (SSM) 25. The payment processor apparatus can be embodied in one or more servers.

According to an embodiment of the present invention, the payment provider is generating its own asymmetric keys when a new payment method is generated for a customer. From the provider virtual account side, the same initialization process applies when the customer will initiate the first 1 cent transaction thus creating the same genesis point on the payment provider side. To execute then a payment on behalf of the customer, the payment processor will then account for receiving two messages, one from the customer application and one from the supplier apparatus. It will then check the authenticity of the customer signature, device and the associated previous random transaction. Because each of the wallet is per se a tree list of transactions, the lookup to identify a transaction is very fast by using a Merkle Proof. The same Merkle Proof can be applied to separate transactions across wallets and prove that they belong to a customer transaction stream. To prevent a double spending attack, once an incoming transaction is pending processing, the value of the account is locked for the duration of the transaction and released with the debited value when the transaction validates and clears.

FIG. 5 shows the basic structure of the supplier apparatus for carrying out a method in accordance with an embodiment of the present invention. A processor 31 is programmed to control a transmitter 32 and receiver 33 for communicating messages to the other parties. A memory 44 holds the program instructions for the processor and a database of transaction data that will be described in more detail hereinafter. The display 35 provides a user interface for the payment processor where the amount to be paid is displayed. The processor 31 also handles the encryption and decryption as well as hashing, but one of skill in the art understands that these tasks can also be handles by additional processors or more preferably, a trusted computing hardware module or a software security module. The payment processor apparatus can be embodied in one or more payment devices with the ability to read a payment card through swipe, insert of contact-less.

The payment processor device facilitates the payment for a product in a physical form in a store. The device is connected to the stream/chain network through an internet connection. The device contains a trusted compute CPU as well as software security module which allows the secure exchange of information as well as holding the asymmetric cryptographic keys on the device. Upon payment initiation the device will initiate a secondary message containing the device identification, the hash of the plain text information made available by the payee and its own timestamp together with the amount.

Figure 9:
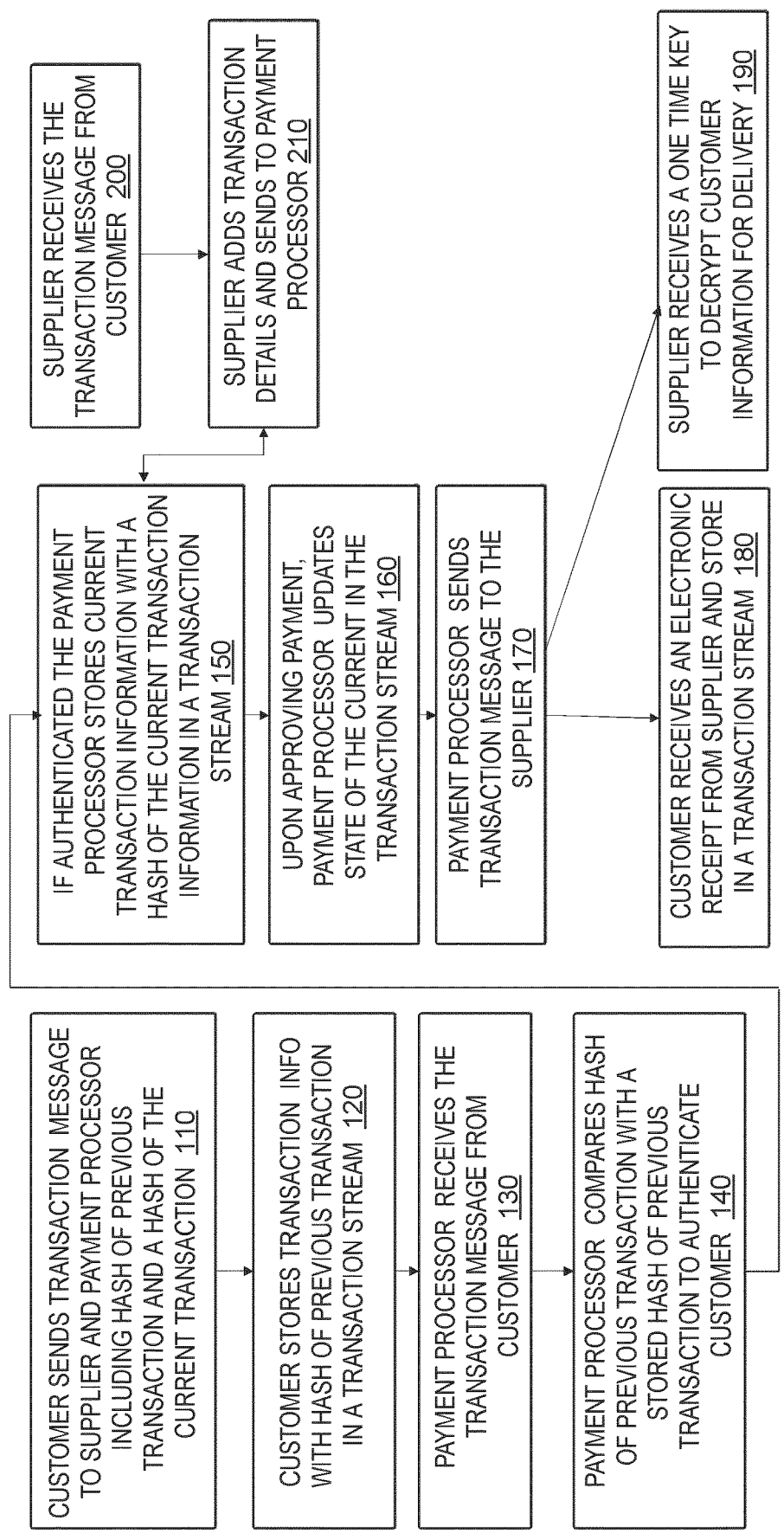
FIG. 9 shows a flowchart of a method in accordance with an embodiment of the invention.

FIG. 9 is a flowchart of a method according to an embodiment the present invention. The method described is for a particular embodiment of a transaction, however, one of skill in the art would understand that the method could be extended to other types of transactions as well. In the case of delivery of goods one path is taken while in store pickup follows a slightly different path.

A customer seeks to purchase a particular item from a supplier using a credit card from a particular payment processor. In this embodiment, the customer is shopping online and selects the item to be purchased on the supplier's website through a wallet available in the browser as a software. To initiate the method, in step 110 the customer sends a transaction message from a customer account on for the current transaction to the payment processor and to the supplier including a hash of transaction information from a previous transaction of the customer with the payment processor, a hash of transaction information from the current transaction and an encryption of transaction information for the current transaction including a state of the transaction. The encryption is an asymmetric public key/private key encryption with one public key provided to the payment processor by the customer and wherein the key verifies the authenticity of a different portion of the encrypted transaction information for the current transaction.

The encryption is preferably homomorphic and, more preferably, polymorphic for secure multi-party computation. The transaction information includes the transaction amount, the supplier information, customer information such as address and telephone number if the transaction requires a delivery and transaction identification information. Using the keys supplied to the payment processor, the payment processor can decrypt the transaction amount and the supplier information. The supplier, on the other hand, will only be able to decrypt the customer information on a limited basis, and preferably, the supplier will only be able to decrypt the customer delivery address one time after the transaction is successfully executed.

In step 120, the customer also stores the transaction information from the current transaction along with the hash of the transaction information from the previous transaction in a stream of transaction data in the customer account in the memory 14.

In step 130, the payment processor receives the transaction message from the customer for the current transaction including a hash of transaction information from a previous transaction of the customer with the payment processor, a hash of transaction information from the current transaction and an encryption of transaction information for the current transaction including a state of the transaction. The encryption is a public key/private key encryption with the public key provided to the payment processor by the customer and wherein the public key of the payment processor verifies the authenticity of the provided information.

In step 140, the payment processor compares the hash of the transaction information from the previous transaction with a stored hash of the transaction information from the previous transaction in order to authenticate the customer. This comparison prevents fraud, since only the actual customer will have the hash of the previous transaction. Preferably, hashes are only available to the customer and payment provider. In addition, a shared secret is sent via an RSA channel, time bound to a specific amount to account for transaction time drift between the two messaged, on which only the customer and payment processor have knowledge of. It is an advantage of the present invention that in the event that the hashes do become available to a $3^{rd}$ party, that $3^{rd}$ party will still need to have access to the secret sharing part.

If the customer is authenticated, then in step 150 the payment processor stores transaction information from the current transaction along with the hash of transaction information from the current transaction and the state of the transaction in a stream of transaction data in memory 24.

In parallel a message sent by supplier with its information is awaited by the payment processor. The supplier will provide the message received from the customer and will add the transaction price and its timestamp. For a store transaction, the device will add its public key identification registered with the stream/chain network and verified by the payment provider.

In step 160, upon approving payment in the current transaction, the payment processor updates the state of the current transaction in the stream of transaction data. In step 170, a transaction message is sent by the payment processor to the supplier for the current transaction with updated state information.

At this point, the supplier completes the transaction. As noted, the supplier has received the transaction message from the customer in step 200. The transaction message from a customer for the current transaction includes an encryption of transaction information for the current transaction including a state of the transaction, wherein the encryption is a public key/private key encryption with the public key provided to the payment processor by the customer and wherein the encryption provides only limited access to customer identification information in the transaction information. In step 210, the supplier stores transaction information from the current transaction in memory 34. Upon receiving an update to the state of the current transaction from the payment processor, e.g., the payment has been approved, the supplier accesses customer identification information on a limited basis in step 190, FIG. 9 to complete the current transaction. As noted, the supplier will preferably be able to only access the customer delivery address information once.

The supplier sends an electronic receipt to the customer, who would then receive the receipt in step 180 and store it in the transaction stream in memory 14.

A user interface on the display of the apparatus is preferably an application program interface (API) such as a local API, web API or program API and, alternatively, can be a network interface controller that connects a computer to a computer network or a virtual network interface connecting a computer to a virtual private network.

The network shown in FIG. 3 is preferably a communications network using one or more commercial communications protocols, such as TCP/IP, FTP, UPnP, NFS, or CIFS. The network can be wireless or wired, including a local area network (LAN), a wide-area network (WAN), a virtual private network (VPN), the internet, an intranet, an extranet, a public switched telephone network (PSTN), a cellular network, a satellite communications network, an infrared network, another type of wireless network, and the like, or a combination of the foregoing.

An example of the present invention can include a database formed from a variety of data stores and other memory or storage media. These components can reside in one or more of the servers, as discussed above, or may reside in a network of the servers. In certain embodiments, the information may reside in a storage-area network (SAN). Similarly, files for performing the functions attributed to the computers, servers or other network devices discussed above may be stored locally and/or remotely, as appropriate. Each computing system described above, including the client devices, may incorporate hardware elements that are electrically coupled via data/control/and power buses. For example, one or more processors in such computing systems may be central processing units (CPU) for one or more of the client devices. The client devices may further include at least one user device (e.g., a mouse, keyboard, controller, keypad, or touch-sensitive display) and at least one output device (e.g., a display, a printer or a speaker). Such client devices may also include one or more storage devices, including disk drives, optical storage devices and solid-state storage devices such as a random-access memory (RAM) or a read-only memory (ROM), as well as removable media devices, memory cards, flash cards, etc.

The computer systems discussed above can also include computer-readable storage media reader, communications devices (e.g., modems, network cards (wireless or wired), or infrared communication devices) and memory, as previously described. The computer-readable storage media reader is connectable or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware also might be used, and/or particular elements might be implemented in hardware, in software (including portable software, such as applets), or in both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based upon the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures and configurations, but the desired features can be implemented using a variety of alternative architectures and configurations. Indeed, it will be apparent to one of skill in the art how alternative functional, logical, or physical partitioning and configurations can be implemented to implement the desired features of the present disclosure. For example, while a single server and a processor are illustrated, the server functions can be distributed over a number of servers and processors. Additionally, with regard to flow diagrams, operational descriptions, and method claims, the order in which the steps are presented herein shall not mandate that the steps of the various embodiments be implemented in the order presented, unless the context dictates otherwise.

Although the disclosure is described above in terms of various example embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosure, whether or not such embodiments are described, and whether or not such features are presented as being a part of a described embodiment. Thus, the breadth and scope of the present disclosure should not be limited by any of the above-described example embodiments, and it will be understood by those skilled in the art that various changes and modifications to the previous descriptions may be made within the scope of the claims.

The invention claimed is:

1. A method for effecting a payment to a supplier from a payment processor on behalf of a customer, comprising the steps by the customer of:
   sending a transaction message from a customer account for a current transaction to a payment processor and to a supplier including a hash of transaction information from a previous transaction of the customer with the payment processor, a hash of transaction information from the current transaction and an encryption of transaction information for the current transaction including a state of the transaction,
   wherein the encryption is a public key/private key encryption with one public key provided to the supplier by the customer and a different public key provided to the payment processor by the customer and wherein the two public keys each verifies the authenticity of different portions of the encrypted transaction information for the current transaction; and
   storing transaction information from the current transaction along with the hash of the transaction information from the previous transaction in a stream of transaction data in the customer account.

2. The method according to claim 1, wherein the customer account includes a hierarchical deterministic wallet for generating public keys for use with a plurality of suppliers and payment processors.

3. The method according to claim 1, wherein the encryption is a homomorphic encryption.

4. The method according to claim 1, wherein the encryption is a polymorphic encryption.

5. The method according to claim 1, wherein the transaction information includes a transaction amount, supplier information, customer information and transaction identification information and wherein the payment processor can decrypt the transaction amount and supplier information.

6. The method according to any claim 1, wherein the transaction information includes a transaction amount, supplier information, customer information and transaction identification information and wherein the supplier can decrypt client identification information on a limited basis.

7. The method according to claim 6, wherein the supplier can decrypt a client delivery address only a single time.

8. The method according to claim 1, further comprising receiving an electronic receipt from the supplier and storing the electronic receipt in the stream of transaction data.

9. A method for effecting payment to a supplier by a payment processor on behalf of a customer, comprising the steps by the payment processor of:
   receiving a transaction message from a customer for a current transaction including a hash of transaction information from a previous transaction of the customer with the payment processor, a hash of transaction information from the current transaction and an encryption of transaction information for the current transaction including a state of the transaction,
   wherein the encryption is a public key/private key encryption with the public key provided to the payment processor by the customer and wherein the public key of the payment processor verifies the authenticity of the provided information;
   comparing the hash of the transaction information from the previous transaction with a stored hash of the transaction information from the previous transaction to authenticate the customer;
   storing transaction information from the current transaction along with the hash of transaction information from the current transaction and the state of the transaction in a stream of transaction data;
   upon approving payment in the current transaction, updating the state of the current transaction in the stream of transaction data; and
   sending a transaction message to the supplier for the current transaction with updated state information.

10. The method according to claim 9, wherein the encryption is a homomorphic encryption.

11. The method according to claim 9, wherein the encryption is a polymorphic encryption.

12. The method according to claim 9, wherein the transaction information includes a transaction amount, supplier information, customer information and transaction identification information and wherein the payment processor can decrypt the transaction amount and supplier information.

13. A method for effecting payment to a supplier from a payment processor on behalf of a customer, comprising the steps by the supplier of:
    receiving a transaction message from a customer for a current transaction including an encryption of transaction information for the current transaction including a state of the transaction, wherein the encryption is a public key/private key encryption with the public key provided to the supplier by the customer and wherein the public key of the supplier verifies the authenticity of the provided information and wherein the encryption provides only limited access to customer identification information in the transaction information;
    storing transaction information from the current transaction; and
    upon receiving an update to the state of the transaction of the current transaction from the payment processor, accessing customer identification information on a limited basis to complete the current transaction.

14. The method according to claim 13, wherein the encryption is a homomorphic encryption.

15. The method according to claim 13, wherein the encryption is a polymorphic encryption.

16. The method according to claim 13, wherein the transaction information includes a transaction amount, supplier information, customer information and transaction identification information and wherein the supplier and wherein the supplier can decrypt client identification information on a limited basis.

17. The method according to claim 16, wherein the supplier can decrypt a client delivery address only a single time.

18. The method according to claim 13, further comprising sending an electronic receipt to the customer for storing in the customer stream of transaction data.

19. An apparatus for effecting a payment to a supplier from a payment processor on behalf of a customer, comprising:
    a transmitter for sending a transaction message from a customer account for a current transaction to a payment processor and to a supplier including a hash of transaction information from a previous transaction of the customer with the payment processor, a hash of transaction information from the current transaction and an encryption of transaction information for the current transaction including a state of the transaction,
    wherein the encryption is a public key/private key encryption with one public key provided to the supplier by the customer and a different public key provided to the payment processor by the customer and wherein the two public keys each verifies the authenticity of different portions of the encrypted transaction information for the current transaction; and
    a memory for storing transaction information from the current transaction along with the hash of the transaction information from the previous transaction in a stream of transaction data in the customer account.

20. An apparatus for effecting payment to a supplier by a payment processor on behalf of a customer, comprising:
    a receiver for receiving a transaction message from a customer for a current transaction including a hash of transaction information from a previous transaction of the customer with the payment processor, a hash of transaction information from the current transaction and an encryption of transaction information for the current transaction including a state of the transaction, wherein the encryption is a public key/private key encryption with the public key provided to the payment processor by the customer and wherein the public key of the payment processor verifies the authenticity of the provided information;
    a comparator for comparing the hash of the transaction information from the previous transaction with a stored hash of the transaction information from the previous transaction to authenticate the customer;
    a memory for storing transaction information of an authenticated customer from the current transaction along with the hash of transaction information from the current transaction and the state of the transaction in a stream of transaction data;
    a processor for updating the state of the current transaction in the stream of transaction data upon approving payment in the current transaction; and
    a transmitter for sending a transaction message to the supplier for the current transaction with updated state information.

21. An apparatus for effecting payment to a supplier from a payment processor on behalf of a customer, comprising:
    a receiver for receiving a transaction message from a customer for a current transaction including an encryption of transaction information for the current transaction including a state of the transaction, wherein the encryption is a public key/private key encryption with the public key provided to the supplier by the customer and wherein the public key of the supplier verifies the authenticity of the provided information and wherein the encryption provides only limited access to customer identification information in the transaction information;
    a memory for storing transaction information from the current transaction; and
    a processor for accessing customer identification information on a limited basis to complete the current transaction upon receiving an update to the state of the transaction of the current transaction from the payment processor.

* * * * *